US011062083B1

(12) United States Patent
Hitchcock et al.

(10) Patent No.: US 11,062,083 B1
(45) Date of Patent: Jul. 13, 2021

(54) AUTOMATED DATA ENTRY OPTIMIZATION BY RECOGNIZING INVALID DATA

(71) Applicant: Amazon Technologies, Inc., Seattle, WA (US)

(72) Inventors: Daniel Wade Hitchcock, Bothell, WA (US); Shariq Siddiqui, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1096 days.

(21) Appl. No.: 14/963,812

(22) Filed: Dec. 9, 2015

(51) Int. Cl.
*G06F 40/174* (2020.01)
*G06F 3/16* (2006.01)

(52) U.S. Cl.
CPC ............ *G06F 40/174* (2020.01); *G06F 3/167* (2013.01)

(58) Field of Classification Search
None
See application file for complete search history.

(56) References Cited

U.S. PATENT DOCUMENTS

| | | | | |
|---|---|---|---|---|
| 8,214,362 B1* | 7/2012 | Djabarov | ............. | G06F 17/243 707/713 |
| 2002/0198935 A1* | 12/2002 | Crandall, Sr. | ......... | G06F 17/243 709/203 |
| 2005/0257134 A1* | 11/2005 | Goodman | ............. | G06F 17/243 715/226 |
| 2006/0179404 A1* | 8/2006 | Yolleck | ................. | G06F 17/243 715/272 |
| 2008/0215976 A1* | 9/2008 | Bierner | .................. | G06Q 99/00 715/708 |
| 2010/0037303 A1* | 2/2010 | Sharif | ..................... | G06F 21/31 726/6 |
| 2013/0283141 A1* | 10/2013 | Stevenson | .............. | G06Q 10/10 715/222 |
| 2013/0290075 A1* | 10/2013 | Kathooria | ........ | G06Q 10/06395 705/7.41 |

OTHER PUBLICATIONS

Simo Ahava, Google Tag Manager: DOM Listener, Apr. 22, 2014, Simo Ahava's Blog, pp. 1-9.*
Tomomi Imura, Creating a Custom HTML5 Form Validation, Nov. 21, 2012, girliemac.com, pp. 1-8 (Year: 2012).*

\* cited by examiner

*Primary Examiner* — Howard Cortes
(74) *Attorney, Agent, or Firm* — Thomas | Horstemeyer, LLP

(57) ABSTRACT

Disclosed are various embodiments for optimizing automated data entry by recognizing invalid data items and providing alternatives. An electronic form that requests a plurality of data items is received. The data items are automatically provided to the electronic form using stored data and/or automatically generated data. It is automatically detected that a particular data item is deemed invalid for the electronic form. In various embodiments, a suggestion for providing a valid data item may be extracted from the electronic form. An alternative data item is then automatically provided to the electronic form in place of the particular data item based at least in part on the suggestion.

20 Claims, 8 Drawing Sheets

AUTOMATED DATA ENTRY OPTIMIZATION BY RECOGNIZING INVALID DATA

BACKGROUND

In creating an online account, a user may be asked to provide a variety of information via a web form. For example, users may be required to enter their first and last names, an email address, a mailing address, a desired username, a desired password, and/or other information. It can be a hassle for the user to type or otherwise input this information, especially on a mobile device with a touch display.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to optimizing automated entry of data in electronic forms through the recognition of situations in which automatically entered data is deemed invalid. Automated form filling technology may be deployed in a browser to ease the entry of frequently requested information. For example, forms of multiple network sites may request the first name, the last name, and the email address of a user. Each form field may have a recognizable internal name or label, such as "first_name," "last_name," and "email." After a user first fills a form with this information, the browser can store the information in association with the internal names. Subsequently, when the user is presented with a form by another organization requesting the same information in fields corresponding to the same or similar internal names, the browser can fill the fields using the stored information.

Nonetheless, automated entry of information does not always work correctly. As an example, when a user is prompted for a desired username to create an account with a first organization, a stored username that was provided in a different form to create an account with a second organization may not be acceptable to the first organization. The desired username may already be taken by another user, or the desired username may not meet formatting guidelines for the first organization (e.g., the second organization may accept six-character usernames, but the first organization may require eight-character usernames). As another example, a mailing address containing a Post Office box number may be acceptable in one context, but the same mailing address may be unacceptable in a another context where a physical street address is required.

Various embodiments of the present disclosure optimize automated data entry in the form-filling context by detecting when automatically entered data is deemed unacceptable or invalid. An indication of invalidity can be detected synchronously with the data entry or upon submission of the form. When a particular field of information is detected to be invalid, alternate stored information can be provided or generated on-demand. The form may be refilled with different information many times until successful, or as a last resort, the user may be prompted to supply valid information. Because little to no user involvement is typically required, actions such as online account creation can be performed via smartwatches, interactive voice devices, and other client devices with limited text-entry capabilities.

Figure 1:
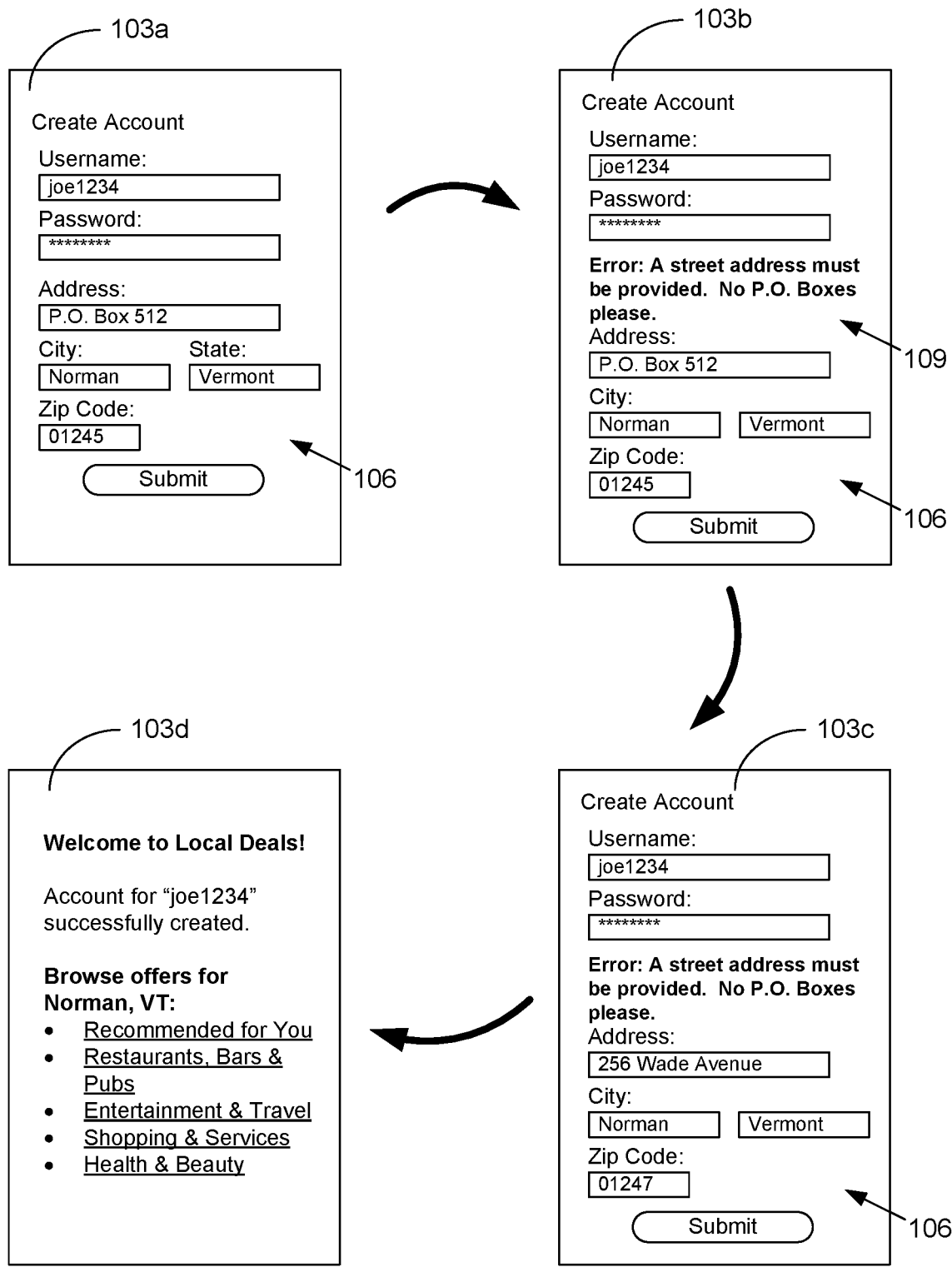
FIG. 1 is a drawing of an example scenario including a sequence of user interfaces that illustrate automated data entry in accordance with embodiments of the present disclosure.

Turning now to FIG. 1, shown is a drawing of an example scenario 100 including a sequence of user interfaces 103a, 103b, 103c, and 103d that illustrate automated data entry in accordance with embodiments of the present disclosure. In the user interface 103a, an electronic form 106 is shown for creating an account with an online account provider. The electronic form 106 elicits various types of data, including a username, a password, an address, a city, a state, and a postal code. The electronic form 106 in the user interface 103a has been automatically filled in by automated data entry logic using stored data and/or automatically generated data. For example, the address field is populated with the data item "P.O. Box 512."

Next, in the user interface 103b, the electronic form 106 is updated with an error message 109 stating that a "street address must be provided. No P.O. Boxes please." In accordance with the present disclosure, the automated data entry logic recognizes that the address of "P.O. Box 512" is invalid, and provides an alternative address of "256 Wade Avenue" in the user interface 103c. The alternative address may correspond to previously stored data, e.g., from previous electronic forms that a user has manually filled out. In this case, providing the alternative address involves not only updating the form field affected by the error, but also the postal code field, since the alternative address is associated with a different postal code.

In some examples, the automated data entry logic may retry a succession of different alternatives until the data item is accepted by the electronic form without error, or until a limit is reached and user intervention is deemed necessary. In this instance, the new street address is accepted by the electronic form, and the user interface 103d indicates that the corresponding account was created successfully. The user interface 103d may correspond to a welcome screen and allow the user to perform various functions as an authenticated user. In the following discussion, a general description of the system and its components is provided, followed by a discussion of the operation of the same.

Figure 2:
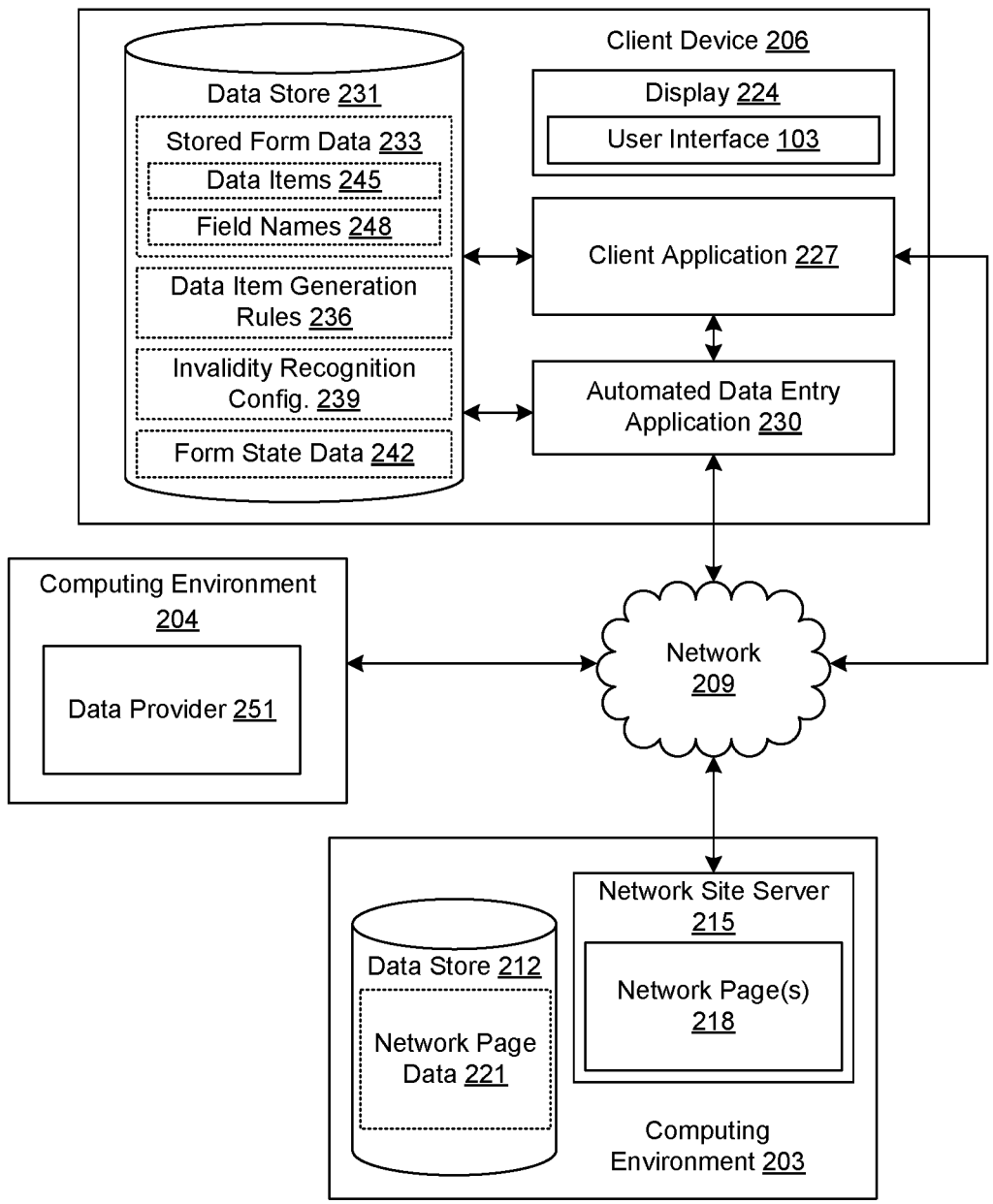
FIG. 2 is a schematic block diagram of a networked environment according to various embodiments of the present disclosure.

With reference to FIG. 2, shown is a networked environment 200 according to various embodiments. The networked environment 200 includes a computing environment 203, a computing environment 204, and a client device 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a network site server 215 and other applications, services, processes, systems, engines, or functionality not discussed in detail herein. The network site server 215 is executed to serve up network pages 218 for one or more network sites, such as web sites. The network site server 215 may correspond to a commercially available hypertext transfer protocol (HTTP) server, such as APACHE HTTP Server, APACHE TOMCAT, MICROSOFT Internet Information Services (IIS), or other servers. The network pages 218 may correspond to web pages, gopher pages, content for native application screens, etc.

The data stored in the data store 212 includes, for example, network page data 221 and potentially other data. The network page data 221 is used by the network site server 215 to generate the network pages 218. To this end, the network page data 221 may include hypertext markup language (HTML), extensible markup language (XML), extensible stylesheet language transformations (XSLT), JAVASCRIPT, JAVASCRIPT object notation (JSON), yet another markup language (YAML), images, audio, video, and/or other data.

The client device 206 is representative of a plurality of client devices 206 that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head-mounted interactive displays, interactive voice devices, or other devices.

The client device 206 may include a display 224. The display 224 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some examples, such as an interactive voice device, the display 224 may be absent from a client device 206.

The client device 206 may be configured to execute various applications such as a client application 227 and an automated data entry application 230. The client device 206 may be configured to execute applications beyond the client application 227 and the automated data entry application 230 such as, for example, email applications, social networking applications, word processors, spreadsheets, and/or other applications. Also, various data is stored in a data store 231 that is accessible to the client device 206. The data store 231 may be representative of a plurality of data stores 231 as can be appreciated. The data stored in the data store 231, for example, is associated with the operation of the various applications and/or functional entities described below.

The client application 227 may be executed in a client device 206, for example, to access network content served up by the computing environment 203 and/or other servers, thereby rendering a user interface 103 on the display 224. To this end, the client application 227 may comprise, for example, a browser, a dedicated application, etc., and the user interface 103 may comprise a network page, an application screen, etc. Some user interfaces 103 rendered by the client application 227 may include an electronic form. In client devices 206 lacking a display 224, the client application 227 may render a network page or other content in an electronic format that is made available to other applications such as the automated data entry application 230.

The automated data entry application 230 is executed to facilitate automated data entry for electronic forms via the client application 227. In various embodiments, the automated data entry application 230 may be integrated into the client application 227, correspond to a plug-in for the client application 227, or be a standalone application. The automated data entry application 230 accesses an electronic form rendered by the client application 227, examines the document object model (DOM) for the form, and determines data items to be filled within the form fields. The field types of an electronic form may include, for example, a text field, a textarea field, a slider, a radio button, a checkbox, a button, a file upload element, a password field, or other fields.

The automated data entry application 230 may map stored data to data requested by a form using metadata as described in U.S. patent application Ser. No. 13/679,254, entitled "MAPPING STORED CLIENT DATA TO REQUESTED DATA USING METADATA," and filed on Nov. 16, 2012, which is incorporated herein by reference in its entirety. In addition to filling electronic forms, the automated data entry application 230 recognizes error messages associated with invalid data. Consequently, the automated data entry application 230 can recover from errors and automatically provide alternative data items to the electronic form.

In various embodiments, the automated data entry application 230 may be configured to enforce parental controls. In some cases, parental users may establish rules that certain types of data (e.g., birthdates, payment instruments) cannot be shared in an electronic form by child users, or that certain types of electronic forms cannot be completed by child users. The automated data entry application 230 may be configured to generate an alert to warn parental users if a child user attempts to fill an electronic form with information that should not be shared or if a child user attempts to fill an unapproved electronic form.

The data stored in the data store 231 includes, for example, stored form data 233, data item generation rules 236, invalidity recognition configuration 239, form state data 242, and potentially other data. The stored form data 233 includes data items 245 that have previously been provided to electronic forms via the client application 227. Non-limiting examples of such data items 245 include names, addresses (e.g., home addresses, business addresses, mailing addresses, street addresses, etc.), telephone numbers, fax numbers, email addresses, usernames, passwords, answers to knowledge-based questions, birthdates, identification numbers, payment instrument information (e.g., credit cards, electronic checks, gift cards, etc.), and so on. In some cases, the stored form data 233 may be managed by a remote server in association with a user account such that the stored form data 233 for a user is available across multiple client devices 206 used by the user. Also, the stored form data 233 can be populated with data items 245 that have been entered into electronic forms by the user on other client devices 206.

Each of the data items 245 may be associated with a field name 248 in the corresponding electronic form into which it was entered by the user. For example, a data item 245 that is a username may be associated with a field name 248 of "username," "_username," "user-name," "formA_username," or other field names 248. The field names 248 may be normalized or grouped such that variations of the same field name 248 (e.g., "password" and "passwd") are associated together. The field name 248 may be obtained from underlying HTML code, XML code, etc., or a DOM of the electronic form. Alternatively, the field name 248 may be obtained from a text or image label adjacent to the corresponding input field of the electronic form.

The data item generation rules 236 contain rules used to generate new data items 245 or to modify existing data items 245 for automatic entry into an electronic form. For example, a data item generation rule 236 for a password may specify that it is to be eight characters long, beginning with an uppercase letter, ending with a lowercase letter, and with numbers in between. Another data item generation rule 236 for a username may specify that it is any combination of "red" and "elephant," e.g., "RedElephant," "Red_Elephant," "redelephant99," "AAAredelephant," etc., where the data item generation rule 236 may permit for adding numbers, letters, special characters, or spaces, changing case, changing letters into numbers, switching word order, or other transformations. Also, a maximum number of attempts to generate valid data items 245 may be specified.

The data item generation rules 236 may pertain to specific types of data items 245 as indicated by field names 248. For example, a data item generation rule 236 may pertain to usernames, dates of birth, passwords, personal names, addresses, or other types of data items 245. The data item generation rules 236 may indicate whether these types of data items 245 can be truncated, preferences on how to truncate (e.g., dropping one or more vowels, removing letters from the beginning, removing letters from the end, etc.), how many characters can be removed via truncation, whether additional characters can be added to the data items 245 for padding, how many additional characters can be added, what types of additional characters can be added as padding (e.g., digits, capital letters, etc.), where the additional characters can be added (e.g., at the beginning, at the end, between words, etc.), and other rules.

In various embodiments, some or all of the data item generation rules 236 can be obtained from an external service. The data item generation rules 236 can be crowd-sourced from multiple end users specifying what the requirements are for various network site forms. For example, a user may supply password or username requirements for a given form, which can be turned into one or more data item generation rules 236. The data item generation rules 236 can be created by the automated data entry application 230 through an empirical understanding of which certain forms will accept or not accept, and through parsing and analysis of "hints" provided through the forms. Such hints may include, for example, "no P.O. boxes permitted," "the username must be greater than six characters," "the password must include at least one letter," and so on.

The invalidity recognition configuration 239 contains parameters that control the recognition of errors or messages indicating invalid data for electronic forms by the automated data entry application 230. As an example, the invalidity recognition configuration 239 may indicate that, after entering a data item 245 into a form field of an electronic form, an update to the DOM of the electronic form within a predefined proximity threshold to the form field is an error message. Factors weighing into consideration may include whether the updated text is in bold, a different color (e.g., red), a larger size, a different font, or having other distinguishing characteristics.

As another example, an error may be detected in a subsequent user interface after an electronic form is submitted for processing. The subsequent user interface may include one or more error messages that may be parsed and recognized by the automated data entry application 230, as configured by the invalidity recognition configuration 239. If the subsequent user interface contains an electronic form similar to the previous electronic form (where similarity is defined by the invalidity recognition configuration 239), some data items 245 may be invalid, as usually the subsequent user interface will be markedly different with some indicator of success.

Although some indicators of invalidity may simply indicate an error, others may provide hints or suggestions for how to provide valid data. For example, if a proposed password lacks a required special character, the indicator of invalidity may suggest adding one of a set of special characters to the password in order to pass validation. The invalidity recognition configuration 239 may configure the automated data entry application 230 to recognize such hints or suggestions and adapt which stored data items 245 are provided or how data items 245 are generated according to the hints or suggestions. As another example, one indicator of invalidity may indicate that a proposed delivery address is outside of a specific delivery radius. The invalidity recognition configuration 239 may configure the automated data entry application 230 to recognize this condition and provide an alternative delivery address that is within the specific delivery radius.

The form state data 242 may contain the state of an electronic form that is being filled out by the automated data entry application 230. The form state data 242 may track the variations of data items 245 that have been provided in order not to provide variations that have already been deemed invalid.

The computing environment 204 may comprise, for example, a server computer or any other system providing computing capability. Alternatively, the computing environment 204 may employ a plurality of computing devices that may be arranged, for example, in one or more server banks, computer banks, or other arrangements. Such computing devices may be located in a single installation or may be distributed among many different geographical locations. For example, the computing environment 204 may include a plurality of computing devices that together may comprise a hosted computing resource, a grid computing resource, and/or any other distributed computing arrangement. In some cases, the computing environment 204 may correspond to an elastic computing resource where the allotted capacity of processing, network, storage, or other computing-related resources may vary over time.

Various applications and/or other functionality may be executed in the computing environment 204 according to various embodiments. The components executed on the computing environment 204, for example, include a data provider 251, and other applications, services, processes, systems, engines, or functionality not discussed in detail herein. The data provider 251 is configured to serve up data items 245 to automated data entry applications 230 upon request in order for the automated data entry application 230 to use the provided data items 245 in automatically filing forms. In one scenario, the data provider 251 may provide the data items 245 to the automated data entry application 230 through an application programming interface (API) over the network 209.

The data provider 251 may be a third-party provider of data such as a Department of Motor Vehicles, a Post Office, a personal data storage account of a user, a payment provider, or other providers. In various situations, the data provider 251 may provide payment instrument information, standardized address information, driver's history information, credit information, personal information previously stored by a user of the client device 206, and other information necessary to complete an electronic form. In some cases, the automated data entry application 230 may authenticate with the data provider 251 using security credentials of the user in order to gain access to data associated with the user.

Figure 3:
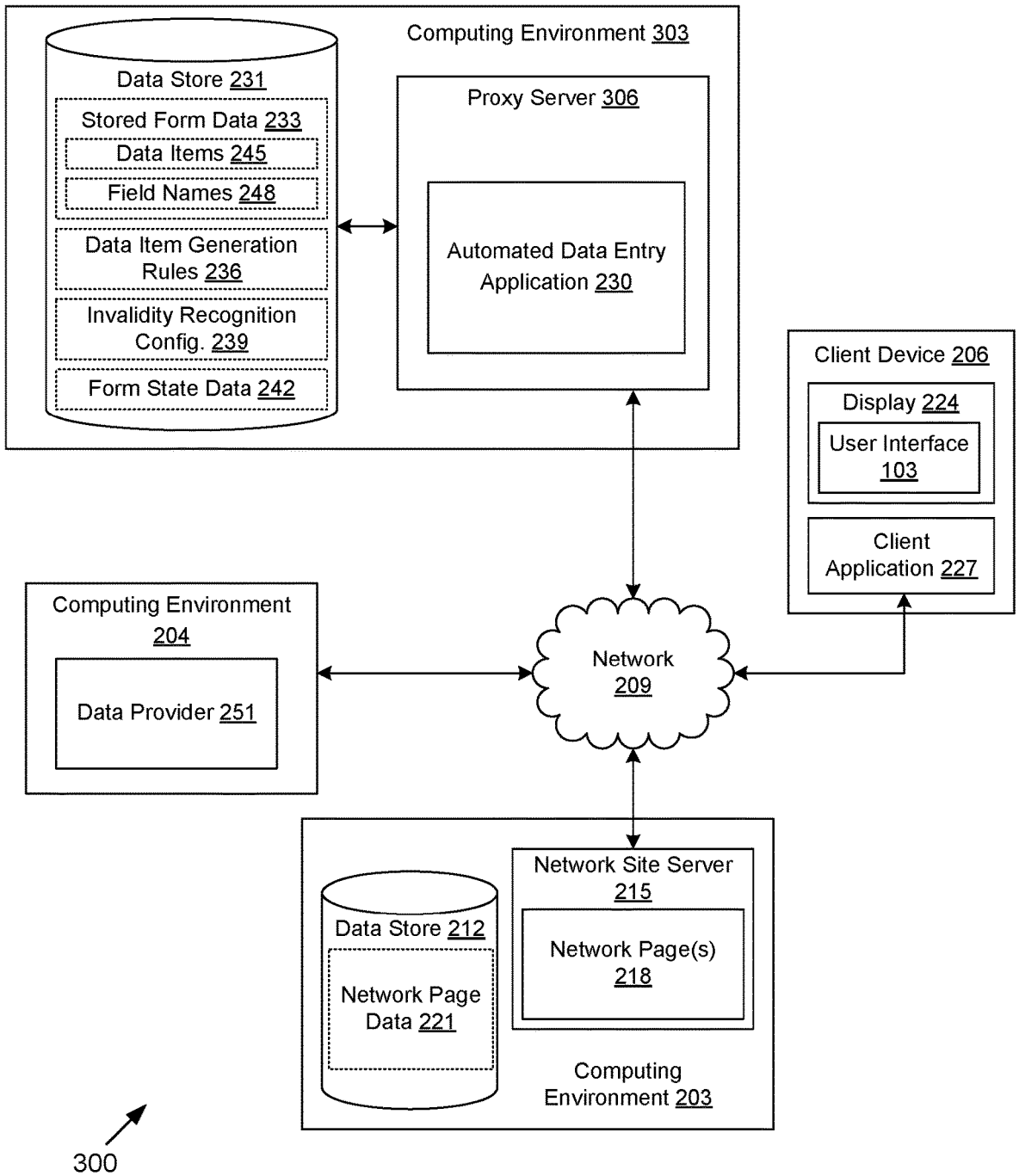
FIG. 3 is a schematic block diagram of a networked environment including a proxy server according to various embodiments of the present disclosure.

Moving on FIG. 3, shown is a networked environment 300 according to various embodiments. The networked environment 300 includes a computing environment 203, a computing environment 204, a computing environment 303, and a client device 206, which are in data communication with each other via a network 209. The computing environment 303 may comprise, for example, a server computer or any other system providing computing capability. Alternatively, the computing environment 303 may employ a plurality of computing devices that may be arranged, for example, in one or more server banks, computer banks, or other arrangements. Such computing devices may be located in a single installation or may be distributed among many different geographical locations. For example, the computing environment 303 may include a plurality of computing devices that together may comprise a hosted computing resource, a grid computing resource, and/or any other distributed computing arrangement. In some cases, the computing environment 303 may correspond to an elastic computing resource where the allotted capacity of processing, network, storage, or other computing-related resources may vary over time.

The networked environment 300 is similar to the networked environment 200, but the automated data entry application 230 is no longer executed in the client device 206, but is instead executed by a proxy server 306 in the computing environment 303. Requests for network pages 218 by the client application 227 are routed through the proxy server 306 and on to the network site server 215, rather than directly to the network site server 215. The network pages 218 are then returned by the network site server 215 to the proxy server 306, which then may perform processing on the network pages 218, and then return the network pages 218 back to the client application 227 of the client device 206.

Similarly, submissions of electronic forms are routed through the proxy server 306, which allows for automated data entry and processing of the electronic forms by the automated data entry application 230. The network page 218 containing the electronic form can be rendered in memory by the proxy server 306 and processed by the automated data entry application 230. Approaches for using proxy servers to fill electronic forms on behalf of clients are described in U.S. patent application Ser. No. 13/792,678, entitled "PROXY SERVER-BASED NETWORK SITE ACCOUNT MANAGEMENT," and filed on Mar. 11, 2013, which is incorporated herein by reference in its entirety.

Figure 4A:
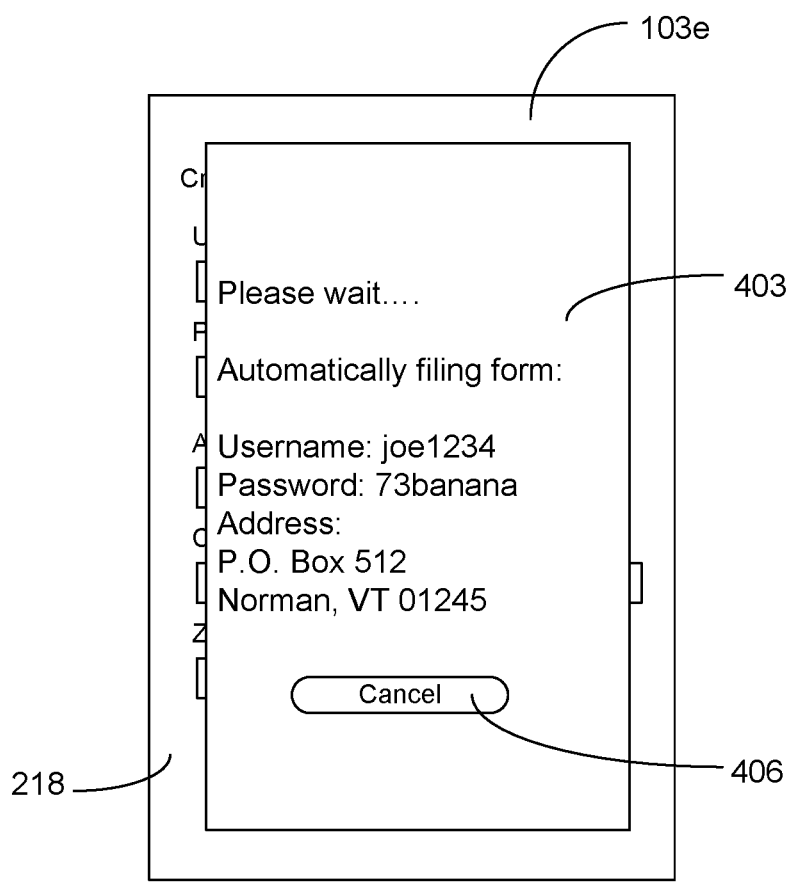
FIGS. 4A-4C are a pictorial diagrams of example user interfaces rendered by a client in the networked environments of FIG. 2 or 3 according to various embodiments of the present disclosure.

Continuing to FIG. 4A, shown is an example user interface 103e rendered by a client device 206 according to various embodiments. The user interface 103e corresponds to a network page 218 containing an electronic form that is being filled out by the automated data entry application 230. Rather than merely displaying the network page 218, the automated data entry application 230 causes a user interface 403 to be rendered which partially or fully hides the network page 218. The user interface 403 explains that the electronic form is being filled out automatically.

In this example, the user interface 403 further describes the data items 245 that are being provided, along with their corresponding field names 248. The user interface 403 may present the information in a summarization or a more compact format than if the underlying electronic form were rendered. By presenting the form information in a more compact, summarized format (e.g., without having to present all of the form fields and their corresponding instructions), better usability is achieved for client devices 206 having limited display capabilities (e.g., smartwatches, mobile phones, etc.). One or more components 406 may be provided to cancel the automatic form filling and/or to allow the user to edit or manually specify specific data items 245. In other examples, a progress indicator may show the current progress with the form filling and submission. In some cases, especially involving the proxy server 306 implementation of FIG. 3, the user interface 403 may be provided to the client application 227 in lieu of the network page 218. In other examples, the automated data entry application 230 may explicitly obtain consent of the user before filling out or submitting the electronic form.

Figure 4B:
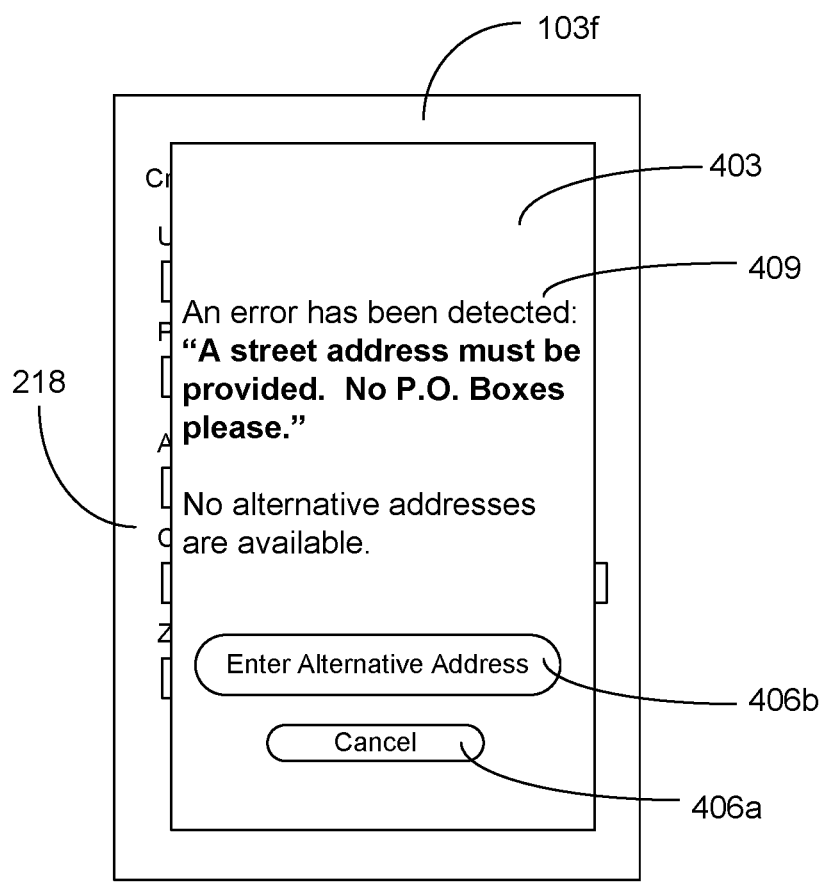

Turning now to FIG. 4B, shown is an example user interface 103f rendered by a client device 206 according to various embodiments. The user interface 103f corresponds to a network page 218 containing an electronic form that is being filled out by the automated data entry application 230. However, in filling out the form automatically, an error has been detected. The user interface 403 rendered on top of the network page 218 gives a further explanation 409 of the error. The explanation 409 indicates that a "street address must be provided. No P.O. Boxes please."

The invalidity recognition configuration 239 causes the automated data entry application 230 to recognize the error and provides rules for selecting an alternative data item 245. For instance, in recognizing "P.O. Box" in the error, the automated data entry application 230 may understand that an alternative address that does not contain "P.O. Box" should be provided. However, in this instance, the explanation 409 indicates that no alternative addresses are available in the stored form data 233. If an alternative address was available, the automated data entry application 230 could have tried it automatically. The component 406a, when selected, allows the user to cancel the form filling, while the component 406b, when selected, allows the user to manually provide an alternative address.

Figure 4C:
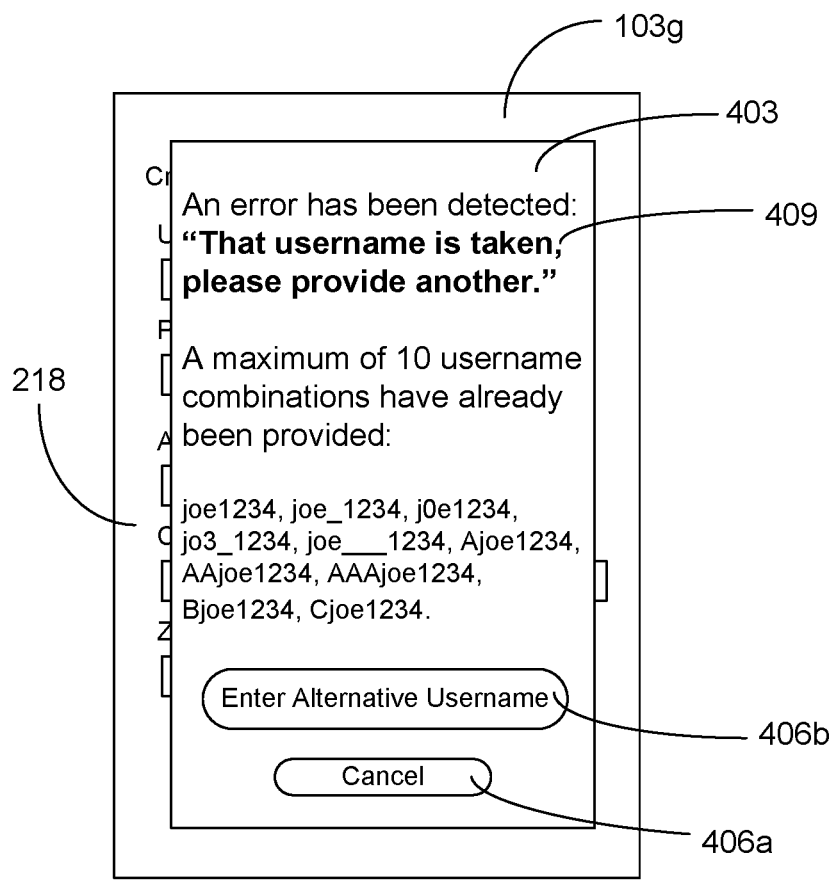

With reference to FIG. 4C, shown is an example user interface 103f rendered by a client device 206 according to various embodiments. The user interface 103g corresponds to a network page 218 containing an electronic form that is being filled out by the automated data entry application 230. However, in filling out the form automatically, an error has been detected. The user interface 403 rendered on top of the network page 218 gives a further explanation 409 of the error. The explanation 409 indicates that a previously entered "username is taken, please provide another."

The invalidity recognition configuration 239 causes the automated data entry application 230 to recognize the error and provides rules for selecting an alternative data item 245. For instance, in recognizing "username" in the error, the automated data entry application 230 may understand that an alternative username should be provided. The automated data entry application 230 proceeded to generate ten different username combinations using the terms "joe" and "1234" and fill the electronic form with them in succession. However, in this instance, the explanation 409 indicates that none of these alternatives was accepted, and the maximum limit of ten attempts had been reached. The component 406a, when selected, allows the user to cancel the form filling, while the component 406b, when selected, allows the user to manually provide an alternative username.

Figure 5:
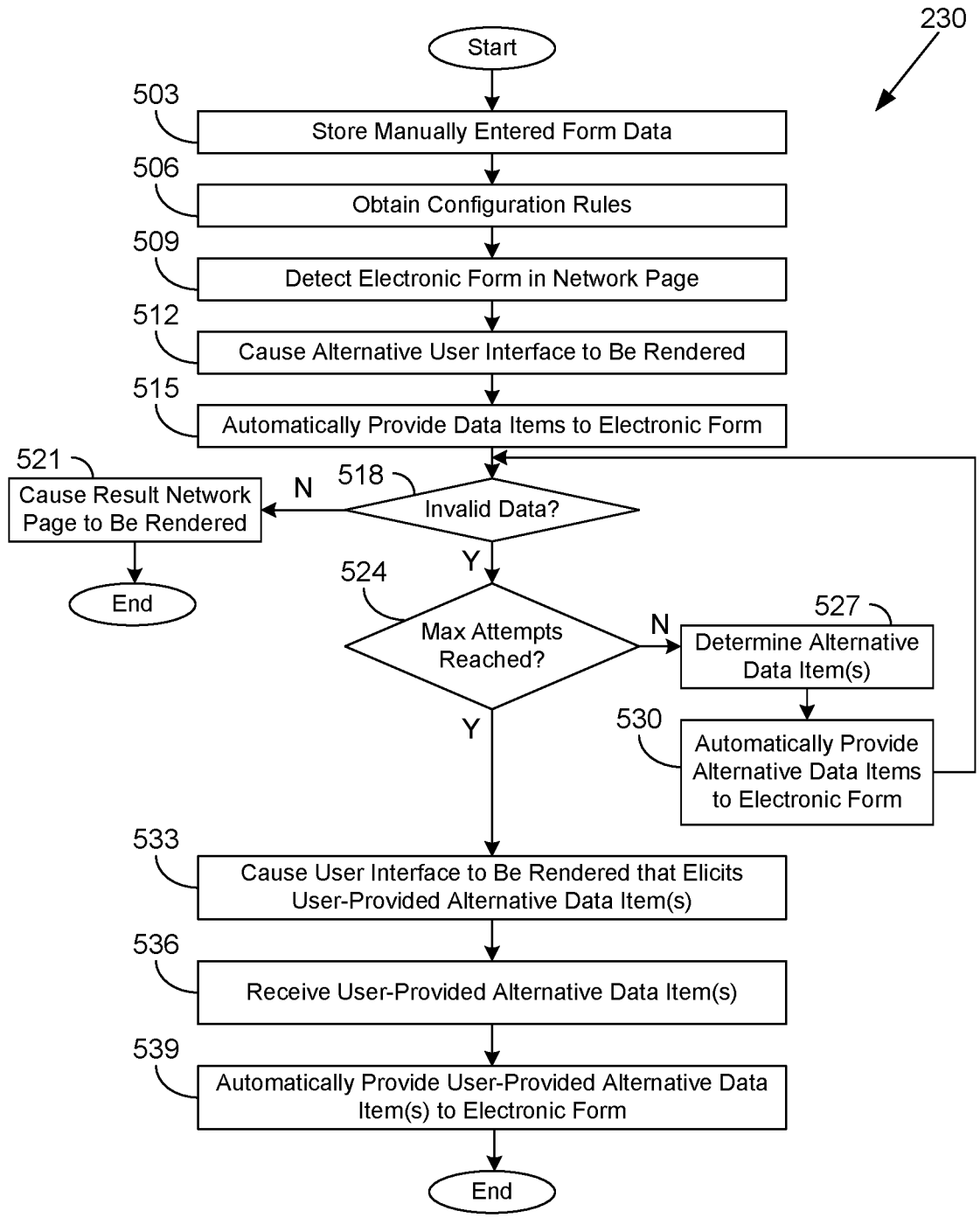
FIG. 5 is a flowchart illustrating one example of functionality implemented as portions of the automated data entry application executed in a client device in the networked environment of FIG. 2 or in a computing environment in the networked environment of FIG. 3 according to various embodiments of the present disclosure.

Referring next to FIG. 5, shown is a flowchart that provides one example of the operation of a portion of the automated data entry application 230 according to various embodiments. It is understood that the flowchart of FIG. 5 provides merely an example of the many different types of functional arrangements that may be employed to implement the operation of the portion of the automated data entry application 230 as described herein. As an alternative, the flowchart of FIG. 5 may be viewed as depicting an example of elements of a method implemented in the client device 206 (FIG. 2) or the computing environment 303 (FIG. 3) according to one or more embodiments.

Beginning with box 503, the automated data entry application 230 stores manually entered form data as the stored form data 233 (FIG. 2) in the data store 231 (FIG. 2) as the user provides information for multiple electronic forms. The automated data entry application 230 may store the data items 245 (FIG. 2) entered by the user as well as the field names 248 (FIG. 2) from the electronic form into which the data items 245 were entered. In some situations, multiple data items 245 may be grouped together (e.g., first and last names, components of an address, etc.). In box 506, the automated data entry application 230 obtains configuration rules, such as the data item generation rules 236 (FIG. 2) or the invalidity recognition configuration 239 (FIG. 2). These rules may be specified by the user or obtained from an external source.

In box 509, the automated data entry application 230 detects an electronic form in a network page 218 (FIG. 2) requested though the client application 227 (FIG. 2). For example, the automated data entry application 230 may recognize an HTML "FORM" tag within HTML data being processed through a proxy server 306 (FIG. 2). Where parental controls are enabled, the automated data entry application 230 may determine whether the electronic form is not permitted to be filled or if certain data requested by the electronic form is not permitted to be shared. The automated data entry application 230 may generate alerts in such cases and refrain from completing the electronic form. In box 512, the automated data entry application 230 may optionally cause an alternative user interface 103 (FIG. 2) to be rendered on the display 224.

For example, the automated data entry application 230 may inject HTML or XML code within the network page 218 returned to the client application 227. Alternatively, when executed by the client device 206, the automated data entry application 230 may invoke API calls to render the alternative user interface 103 on the display 224 (FIG. 2). The alternative user interface 103, similar to the examples of FIGS. 4A-4C, may be used to provide status information to the user, obtain user confirmations, obtain user-specified alternative data items 245, or to simply provide a more streamlined interface to the user. This alternative user interface 103 may cause the user interface 103 that includes the electronic form not to be rendered on the display 224, for example, by completely obscuring it or making it minimized or inaccessible.

In box 515, the automated data entry application 230 automatically provides data items 245 to the electronic form. In this regard, the automated data entry application 230 may scan the electronic form looking for field names 248. This may involve inspecting the DOM of the electronic form, looking for text labels adjacent to form input fields, performing optical character recognition (OCR) on images adjacent to form input fields, or other actions. The automated data entry application 230 then correlates the field names 248 of the electronic form to field names 248 in the stored form data 233. The automated data entry application 230 can then fill the form fields with the corresponding data items 245 from the stored form data 233. In other cases, the automated data entry application 230 may be prompted to acquire data from a data provider 251 in order to fill out the form fields. Where the form field is a drop-down box, check box, or radio buttons, the automated data entry application 230 can select an option corresponding to a stored data item 245.

Additionally, or alternatively, the automated data entry application 230 can automatically generate certain form fields according to configuration rules. For example, the automated data entry application 230 may automatically generate usernames, passwords, answers to knowledge-based questions, and so on. The automated data entry application 230 may store automatically generated data in the stored form data 233 and/or the form state data 242 (FIG. 2).

In some situations, the user may have provided different data items 245 to different types of forms. The automated data entry application 230 may employ a heuristic evaluation of the electronic form to determine a form type (e.g., account creation form, account sign-in form, survey form, etc.). The evaluation may examine the combination of field names, the combination of field types, a form name, textual headings, or other characteristics. The automated data entry application 230 may then automatically fill the electronic form with stored data, automatically obtained data, and/or automatically generated data that corresponds to the form type.

In box 518, the automated data entry application 230 determines whether any of the automatically provided data items 245 are deemed invalid. As non-limiting examples, an automatically provided password may not meet minimum length criteria or character set criteria, a name may exceed a maximum number of characters, a username may be already reserved for another user, a P.O. Box address may not be an acceptable shipping address, an address may not be in a proper format, a provided age may not match a minimum or maximum age value, and so on.

In some scenarios, the DOM of the electronic form may be automatically updated by dynamic HTML and JAVASCRIPT to present an error after a data item has been entered in the form field. The automated data entry application 230 may examine the DOM upon entering data, or periodically thereafter, to determine whether an error is detected. Ultimately, the automated data entry application 230 determines the differences in the electronic form before the data item 245 is entered and after the data item 245 is entered, and the error is likely to be included in the differences. The error may correspond to text above, below, alongside, or otherwise adjacent to the form field containing the error. Alternatively, the error may be above, below, or alongside the electronic form, or may be in a pop-up window, pop-over window, or dialog box. The error may be in a distinguishing format that is different from the normal text labels of the form (e.g., bold, italic, red color, etc.). The automated data entry application 230 may capture the error from the DOM of the network page 218, or the automated data entry application 230 may capture an image of the rendered network page 218 though an operating system call and then perform OCR on the image.

In other scenarios, the indication of invalidity may be apparent only after the entire form is submitted to the network site server 215 (e.g., through a GET, POST, PUT, or another API operation). Thus, the automated data entry application 230 may determine that a document received after submitting the electronic form includes an indication of invalidity. The network site server 215 returns another network page 218. If the form submission is successful, the returned network page 218 is likely to be substantially different than the previous network page 218 containing the electronic form. For example, the returned network page 218 may indicate that the submission was successful and thank the user for submitting the electronic form. However, if one or more data items 245 are deemed invalid, the returned network page 218 is likely to contain the same electronic form as before, possibly with prepopulated data items 245, and including error messages indicating invalidity. The automated data entry application 230 can determine the differences between the network pages 218 and extract the error from the differences.

If the automated data entry application 230 determines that the electronic form has been accepted without any indications of invalidity, the automated data entry application 230 continues from box 518 to box 521 and causes a result network page 218 to be rendered by the client application 227. Thereafter, the operation of the portion of the automated data entry application 230 ends. If the automated data entry application 230 instead determines that invalid data has been provided, the automated data entry application 230 continues to box 524.

In box 524, the automated data entry application 230 determines whether a maximum number of attempts at automatically providing data for the electronic form have been reached. The maximum number of attempts may be defined with respect to a particular data item 245 or across all data items 245 of the electronic form. In some cases, the maximum number of attempts may be defined in terms of elapsed time. For example, the automated data entry application 230 may be permitted to spend ten seconds attempting to fill an electronic form automatically, with as many attempts as can be performed within the ten seconds. If the maximum number of attempts has not been reached, the automated data entry application 230 continues to box 527.

In box 527, the automated data entry application 230 determines one or more alternative data items 245 to be provided. For example, if the detected error pertains to a username, the automated data entry application 230 can provide an alternative username. The alternative username can be loaded from the stored form data 233 based at least in part on other usernames the user has previously provided, or the alternative username can be automatically generated. For example, a username may be generated based at least in part on a stored first and last name. Automatic generation may be according to parameters or rules previously established by the user or in a default configuration of the automated data entry application 230. The automatic generation may involve a modification of a previously provided data item 245 (e.g., truncating characters, adding padding characters, using a synonym, converting units from one system to another, adding or subtracting a numerical value, etc.).

In some cases, the automated data entry application 230 may extract from the detected error a hint or suggestion for providing a valid data item 245, and then use the hint or suggestion to select an alternative data item 245 from multiple stored or obtained data items 245 or to generate an alternative data item 245 according to the hint or suggestion. For example, the hint or suggestion may be to provide an address other than a Post Office box (form returns "no P.O. Boxes permitted"), to add three characters to a username (form returns "minimum eight characters"), to use abbreviations in a street address (form returns "max address length is 20 characters"), etc.

In box 530, the automated data entry application 230 automatically provides the alternative data items 245 to the electronic form. In some cases, multiple data items 245 may be changed because they are grouped together. For example, if an error is detected in a first name, a different last name along with a different first name may be provided by the automated data entry application 230, where first and last names are grouped together. The automated data entry application 230 then returns to box 518 for another determination of whether invalid data has been provided. Through this repetitive process, a succession of alternative data items 245 can be provided.

If the maximum number of attempts has been reached, the automated data entry application 230 proceeds from box 524 to box 533. In box 533, the automated data entry application 230 causes an alternative user interface 103 (FIG. 1) to be rendered by the client device 206 that elicits user-provided alternative data items 245. For example, the automated data entry application 230 may generate a network page 218 or render a window that includes another electronic form with form fields that elicit the data that have been deemed invalid. Such a form may be simplified with respect to the underlying electronic form that is being filled. The alternative user interface 103 may include the error message output along with a listing of the succession of alternative data items 245 that have been automatically provided. The alternative user interface 103 may also facilitate cancellation of the form submission by the user, if desired.

In box 536, the automated data entry application 230 receives the user-provided alternative data items 245 via the alternative user interface 103. In box 539, the automated data entry application 230 automatically provides the user-provided alternative data items 245 to the electronic form via a form submission. The automated data entry application 230 may also record the user-provided alternative data items 245 for future use in the stored form data 233. Thereafter, the operation of the portion of the automated data entry application 230 ends.

Although the flowchart of FIG. 5 includes references to causing user interfaces 103 to be rendered, the rendering of user interfaces 103 may be optional. For example, one embodiment of a client device 206 may be an interactive voice device that lacks a display 224. A user may give a voice command to hear the day's news, but the interactive voice device may need to create an account to access the news from a network site. Thus, the automated data entry application 230 may be employed to automatically provide data items 245 in an electronic form that the user never sees in response to a voice command (e.g., "create account"). The interactive voice device may still interact with the user to vocally obtain alternative data items 245 or to inform the user of errors as needed.

Figure 6:
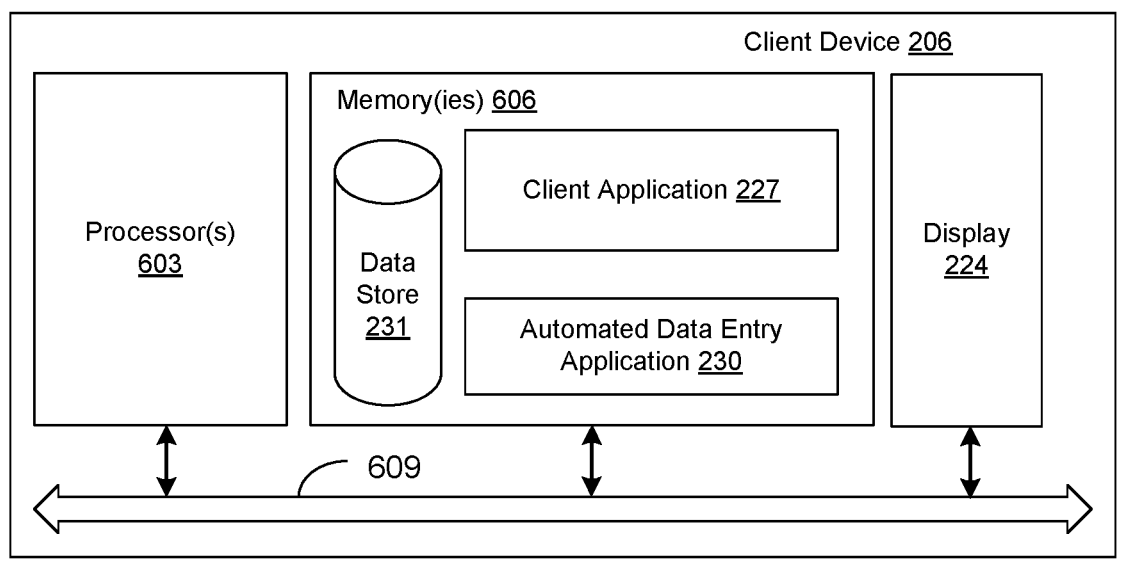
FIG. 6 is a schematic block diagram that provides one example illustration of a client device employed in the networked environment of FIG. 2 according to various embodiments of the present disclosure.

With reference to FIG. 6, shown is a schematic block diagram of the client device 206 according to an embodiment of the present disclosure. The client device 206 at least one processor circuit, for example, having a processor 603 and a memory 606, both of which are coupled to a local interface 609. To this end, the client device 206 may comprise, for example, at least one computing device. The local interface 609 may comprise, for example, a data bus with an accompanying address/control bus or other bus structure as can be appreciated. A display 224 may be coupled to the local interface 609.

Stored in the memory 606 are both data and several components that are executable by the processor 603. In particular, stored in the memory 606 and executable by the processor 603 are the client application 227, the automated data entry application 230, and potentially other applications. Also stored in the memory 606 may be a data store 231 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the client application 227, the automated data entry application 230, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 5 shows the functionality and operation of an implementation of portions of the automated data entry application 230. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system.

The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the client application 227 and the automated data entry application 230, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the client application 227 and the automated data entry application 230, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device or in multiple computing devices in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   receive an electronic form requesting a plurality of data items;
   automatically provide the plurality of data items to the electronic form using at least one of: stored data or automatically generated data;
   automatically detect that a particular data item of the plurality of data items is deemed invalid for the electronic form by:
      detecting a change to a document object model (DOM) of the electronic form after providing the particular data item to the electronic form, wherein the change corresponds to an indication of invalidity; or
      determining that a document received after submitting the electronic form includes an indication of invalidity;
   extracting a suggestion for providing a valid data item from the indication of invalidity;
   automatically provide a succession of alternative data items to the electronic form in place of the particular data item in response to detecting that respective alternative data items in the succession of alternative data items are individually deemed invalid for the electronic form, individual ones of the succession of alternative data items being loaded from the stored data based at least in part on the suggestion or automatically generated based at least in part on the suggestion;
   after a predefined number of alternative data items have been provided and deemed invalid, cause a user interface to be rendered, the user interface eliciting a user-provided alternative data item;
   receive the user-provided alternative data item through the user interface; and
   provide the user-provided alternative data item to the electronic form.

2. The non-transitory computer-readable medium of claim 1, wherein the particular data item is a password, and the individual ones of the succession of alternative data items are automatically generated passwords.

3. The non-transitory computer-readable medium of claim 1, wherein the particular data item is a user-provided data item, and the individual ones of the succession of alternative data items are automated modifications to the user-provided data item.

4. A system, comprising:
   at least one computing device; and
   at least one application executable in the at least one computing device, wherein when executed the at least one application causes the at least one computing device to at least:
      receive an electronic form requesting a plurality of data items;
      automatically provide the plurality of data items to the electronic form using at least one of: stored data or automatically generated data;

automatically detect that a particular data item of the plurality of data items is deemed invalid for the electronic form by detecting an error message that is provided when the particular data item is deemed invalid in either a document received after submitting the electronic form or a document object model (DOM) of the electronic form after providing the particular data item to the electronic form;

automatically extract from the electronic form a suggestion for providing a valid data item; and automatically provide an alternative data item to the electronic form in place of the particular data item based at least in part on the suggestion for providing the valid data item.

5. The system of claim 4, wherein the electronic form is received and the plurality of data items are automatically provided to the electronic form in response to receiving a voice command.

6. The system of claim 4, wherein the alternative data item is requested from a server according to at least one rule.

7. The system of claim 4, wherein the alternative data item is automatically generated according to at least one rule.

8. The system of claim 4, wherein when executed the at least one application further causes the at least one computing device to at least:

cause a user interface to be rendered, the user interface eliciting the alternative data item; and receive the alternative data item through the user interface.

9. The system of claim 4, wherein automatically detecting that the particular data item of the plurality of data items is deemed invalid for the electronic form further comprises detecting a change to the DOM of the electronic form after providing the particular data item to the electronic form, wherein the change corresponds to the error message.

10. The system of claim 4, wherein automatically detecting that the particular data item of the plurality of data items is deemed invalid for the electronic form further comprises determining that the document received after submitting the electronic form includes the error message.

11. A method, comprising:

receiving, via at least one of one or more computing devices, an electronic form requesting a plurality of data items;

automatically providing, via at least one of the one or more computing devices, the plurality of data items to the electronic form using at least one of: stored data or automatically generated data;

causing, via at least one of the one or more computing devices, an alternative user interface to be rendered on a display in place of a user interface showing the electronic form, the alternative user interface presenting a summarization of the plurality of data items that are being provided;

automatically detecting, via at least one of the one or more computing devices, that a particular data item of the plurality of data items is deemed invalid for the electronic form by detecting an error message provided when the particular data item is deemed invalid in either a document received after submitting the electronic form or a document object model (DOM) of the electronic form after providing the particular data item to the electronic form; and automatically providing, via at least one of the one or more computing devices, an alternative data item to the electronic form in place of the particular data item, wherein the alternative data item is loaded from the stored data or is automatically generated.

12. The method of claim 11, further comprising requesting, via at least one of the one or more computing devices, at least one of the plurality of data items from a server.

13. The method of claim 11, further comprising storing via at least one of the one or more computing devices, at least one user-provided data item in the stored data in response to a user manually filling at least one other electronic form.

14. The method of claim 11, further comprising automatically generating, via at least one of the one or more computing devices, the alternative data item by modifying the particular data item according to at least one modification rule.

15. The method of claim 11, further comprising:

determining, via at least one of the one or more computing devices, a data item generation rule based at least in part on the error message; and automatically generating, via at least one of the one or more computing devices, the alternative data item based at least in part on the data item generation rule.

16. The method of claim 11, wherein the user interface is not visible on the display when the alternative user interface is rendered.

17. The method of claim 11, wherein automatically providing the alternative data item to the electronic form in place of the particular data item further comprises automatically providing, via at least one of the one or more computing devices, a succession of alternative data items to the electronic form in place of the particular data item in response to detecting that respective alternative data items in the succession of alternative data items are individually deemed invalid for the electronic form.

18. The method of claim 11, further comprising:

automatically detecting, via at least one of the one or more computing devices, that the alternative data item is also deemed invalid for the electronic form;

receiving, via at least one of the one or more computing devices, a user-provided alternative data item through the alternative user interface; and automatically providing, via at least one of the one or more computing devices, the user-provided alternative data item to the electronic form in place of the particular data item and the alternative data item.

19. The method of claim 11, wherein automatically detecting that the particular data item of the plurality of data items is deemed invalid for the electronic form further comprises detecting, via at least one of the one or more computing devices, a change to the DOM of the electronic form after providing the particular data item to the electronic form, wherein the change corresponds to the error message.

20. The method of claim 11, wherein automatically detecting that the particular data item of the plurality of data items is deemed invalid for the electronic form further comprises determining, via at least one of the one or more computing devices, that the document received after submitting the electronic form includes the error message.

* * * * *